US011751577B2

(12) United States Patent
Abdessamad et al.

(10) Patent No.: US 11,751,577 B2
(45) Date of Patent: Sep. 12, 2023

(54) CUTTING APPARATUS

(71) Applicant: Textor Maschinenbau GmbH, Wolfertschwenden (DE)

(72) Inventors: Aainani Abdessamad, Grönenbach (DE); Josef Mayer, Memmingerberg (DE); Fabian Müller, Betzigau (DE); Markus Seidel, Egg an der Günz (DE); Matthias Hehle, Waltenhofen (DE)

(73) Assignee: Textor Maschinenbau GmbH, Wolfertschwenden (DE)

( * ) Notice: Subject to any disclaimer, the term of this patent is extended or adjusted under 35 U.S.C. 154(b) by 146 days.

(21) Appl. No.: 17/010,431

(22) Filed: Sep. 2, 2020

(65) Prior Publication Data

US 2021/0059266 A1   Mar. 4, 2021
US 2023/0157307 A9   May 25, 2023

(30) Foreign Application Priority Data

Sep. 2, 2019 (DE) .......................... 102019123487.5
Sep. 6, 2019 (DE) .......................... 102019123999.0

(51) Int. Cl.
| | |
|---|---|
| A22C 17/00 | (2006.01) |
| B26D 1/143 | (2006.01) |
| B26D 7/06 | (2006.01) |
| B26D 1/15 | (2006.01) |

(Continued)

(52) U.S. Cl.
CPC .......... A22C 17/0033 (2013.01); A22C 17/00 (2013.01); B26D 1/143 (2013.01);
(Continued)

(58) Field of Classification Search
CPC . A22C 17/0033; A22C 17/00; A22C 17/0625; B26D 1/143; B26D 1/147;
(Continued)

(56) References Cited

U.S. PATENT DOCUMENTS

| | | |
|---|---|---|
| 5,482,166 A | 1/1996 | Brown |
| 6,511,370 B1 | 1/2003 | Mello et al. |
(Continued)

FOREIGN PATENT DOCUMENTS

| | | |
|---|---|---|
| DE | 10054514 A1 | 5/2002 |
| DE | 102006015346 A1 | 10/2007 |
(Continued)

OTHER PUBLICATIONS

German Search Report for related German Application No. 102019123999.0; dated: Jul. 6, 2020; 6 pages.
(Continued)

*Primary Examiner* — Nhat Chieu Q Do
(74) *Attorney, Agent, or Firm* — Dickinson Wright PLLC

(57) ABSTRACT

A cutting apparatus for cutting off or slicing meat products, in particular bacon or fresh meat products, comprises a product feed that is configured to guide at least one first product and at least one second product simultaneously into a cutting region, which includes a first rotating blade and a second rotating blade for cutting off or slicing the products into smaller pieces. In this respect, the product feed has a first conveying means for guiding the at least one first product into the cutting region and a second conveying means for guiding the at least one second product into the cutting region, wherein the first blade is associated with the first conveying means and is provided for cutting off or slicing the at least one first product, and wherein the second blade is associated with the second conveying means and is provided for cutting off or slicing the at least one second product.

22 Claims, 9 Drawing Sheets

(51) Int. Cl.
 *B26D 1/00* (2006.01)
 *B26D 11/00* (2006.01)
 *B26D 1/147* (2006.01)
 *B26D 1/28* (2006.01)
(52) U.S. Cl.
 CPC ............... *B26D 1/147* (2013.01); *B26D 1/15* (2013.01); *B26D 1/28* (2013.01); *B26D 7/0625* (2013.01); *B26D 11/00* (2013.01); *B26D 2001/006* (2013.01); *B26D 2210/02* (2013.01)
(58) Field of Classification Search
 CPC . B26D 11/00; B26D 1/15; B26D 1/28; B26D 2210/02; B26D 2001/006
 USPC .......................................... 452/170, 178–179
 See application file for complete search history.

(56) References Cited

U.S. PATENT DOCUMENTS

| | | | | |
|---|---|---|---|---|
| 9,834,384 | B2* | 12/2017 | Dopp | B26D 5/02 |
| 2003/0209401 | A1* | 11/2003 | Shaw | B65G 13/12 |
| | | | | 193/35 R |
| 2005/0132855 | A1* | 6/2005 | Weber | B26D 9/00 |
| | | | | 83/595 |
| 2006/0021487 | A1* | 2/2006 | Dickover | B26D 1/0006 |
| | | | | 83/835 |
| 2017/0013972 | A1* | 1/2017 | Borg | B65G 13/11 |
| 2018/0265310 | A1* | 9/2018 | Zuckerman | B65G 39/025 |

FOREIGN PATENT DOCUMENTS

| | | | |
|---|---|---|---|
| DE | 102009024189 A1 | 12/2010 | |
| DE | 102011013919 A1 | 9/2012 | |
| EP | 2532494 A1 | 12/2012 | |
| EP | 3070032 A1 * | 9/2016 | |
| EP | 3117743 A1 * | 1/2017 | ............... A47F 1/12 |

OTHER PUBLICATIONS

European Patent Office Communication dated Feb. 17, 2021 for European Patent Application No. 20184359.6, 9 pages.

* cited by examiner

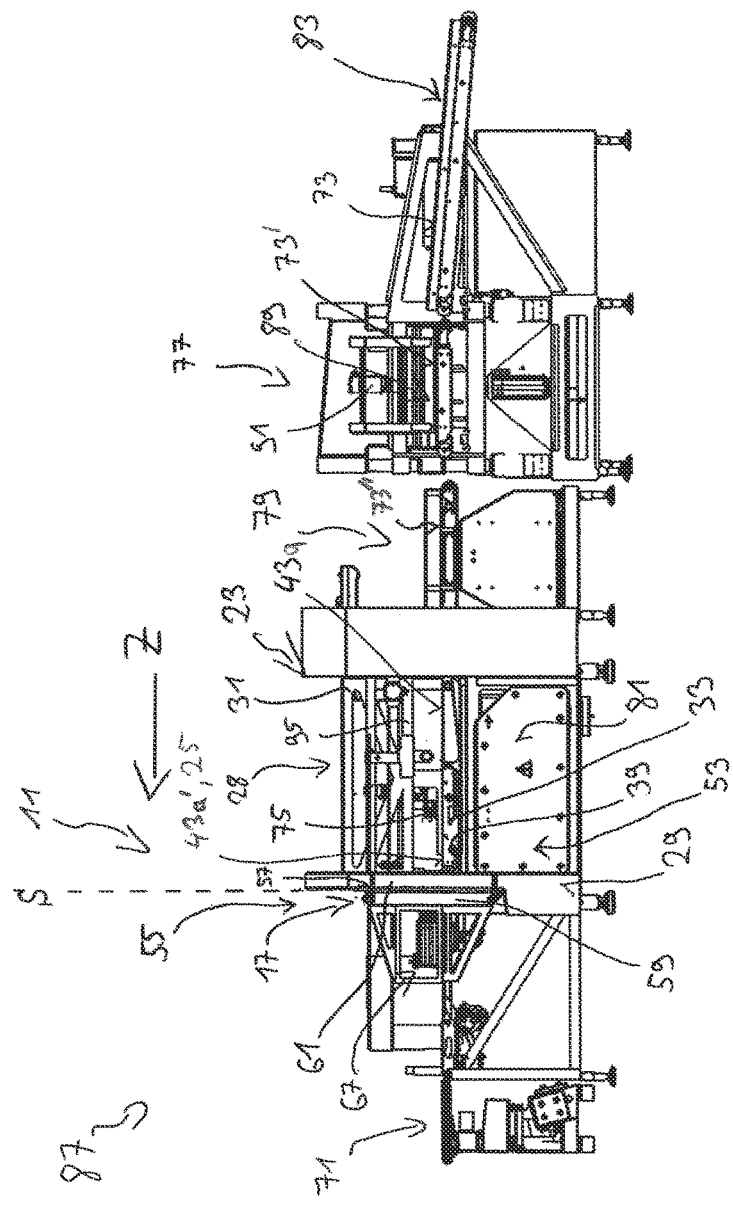

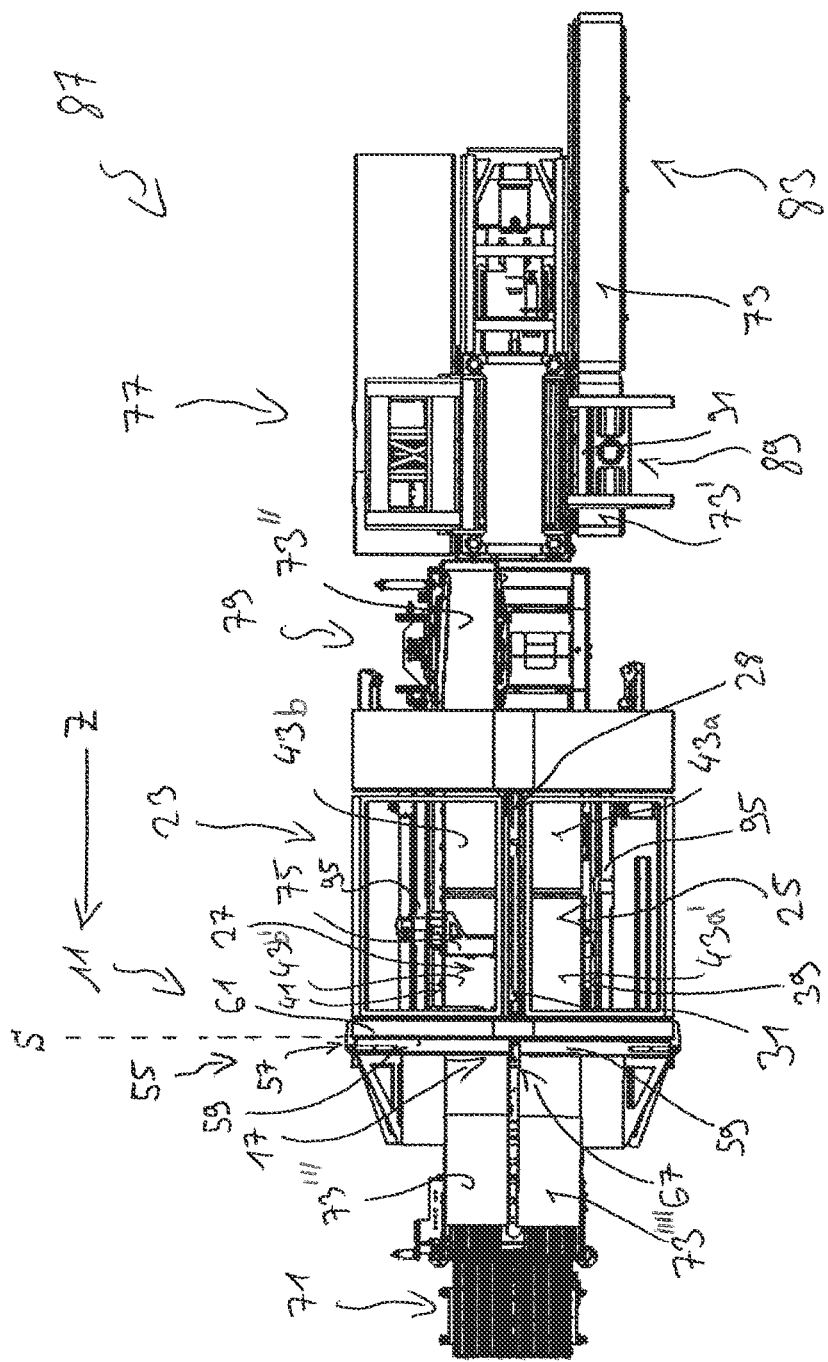

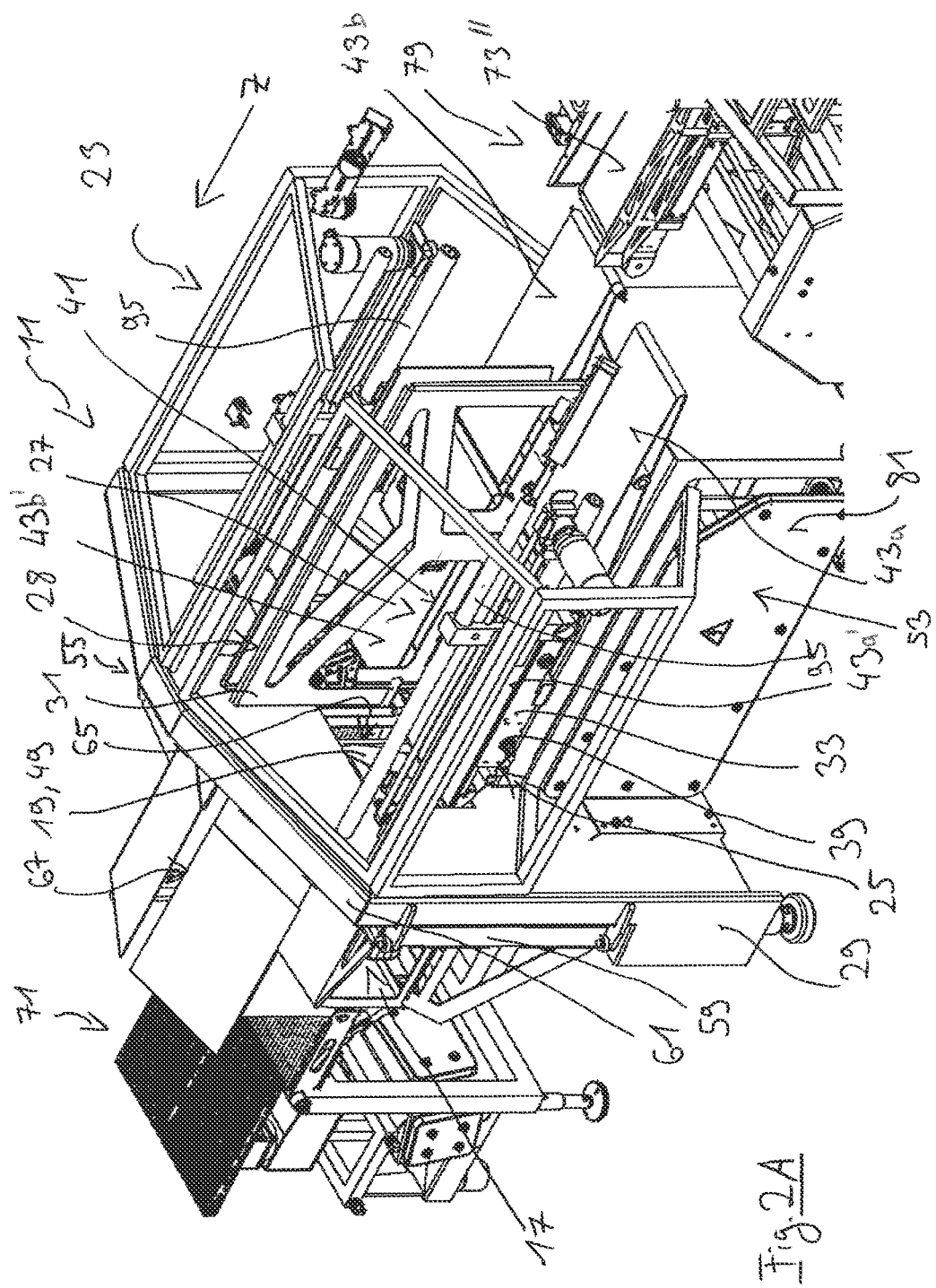

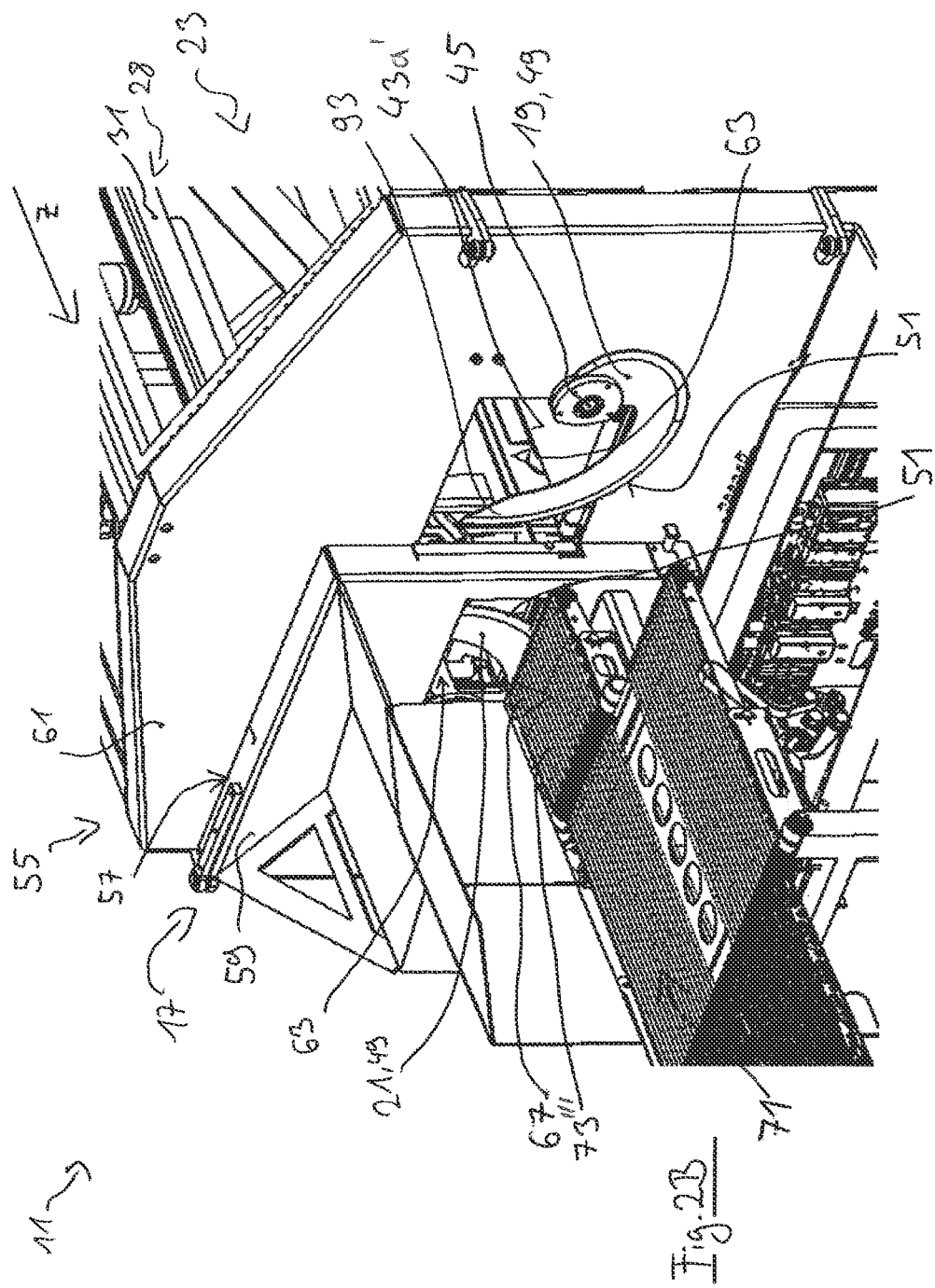

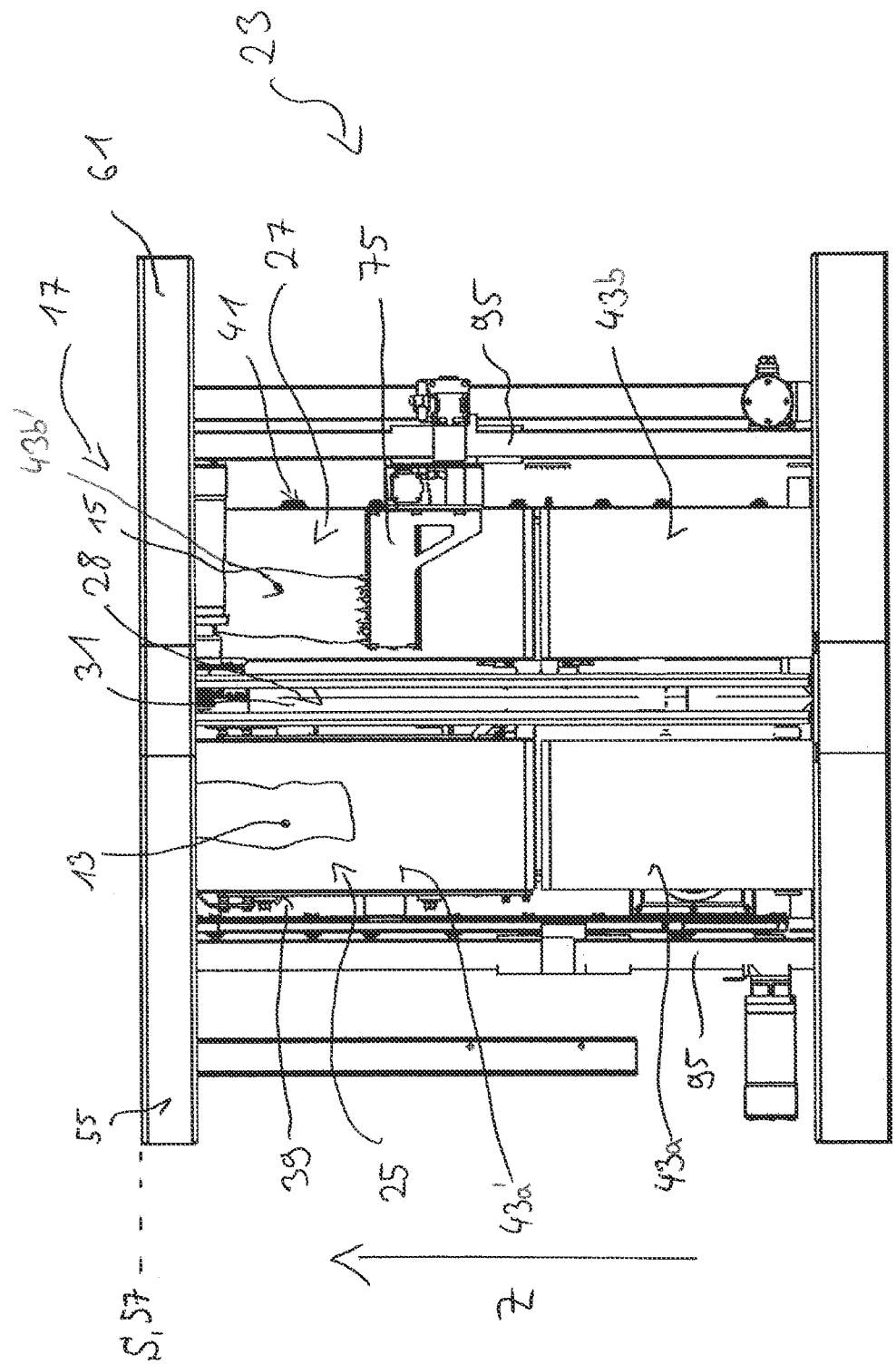

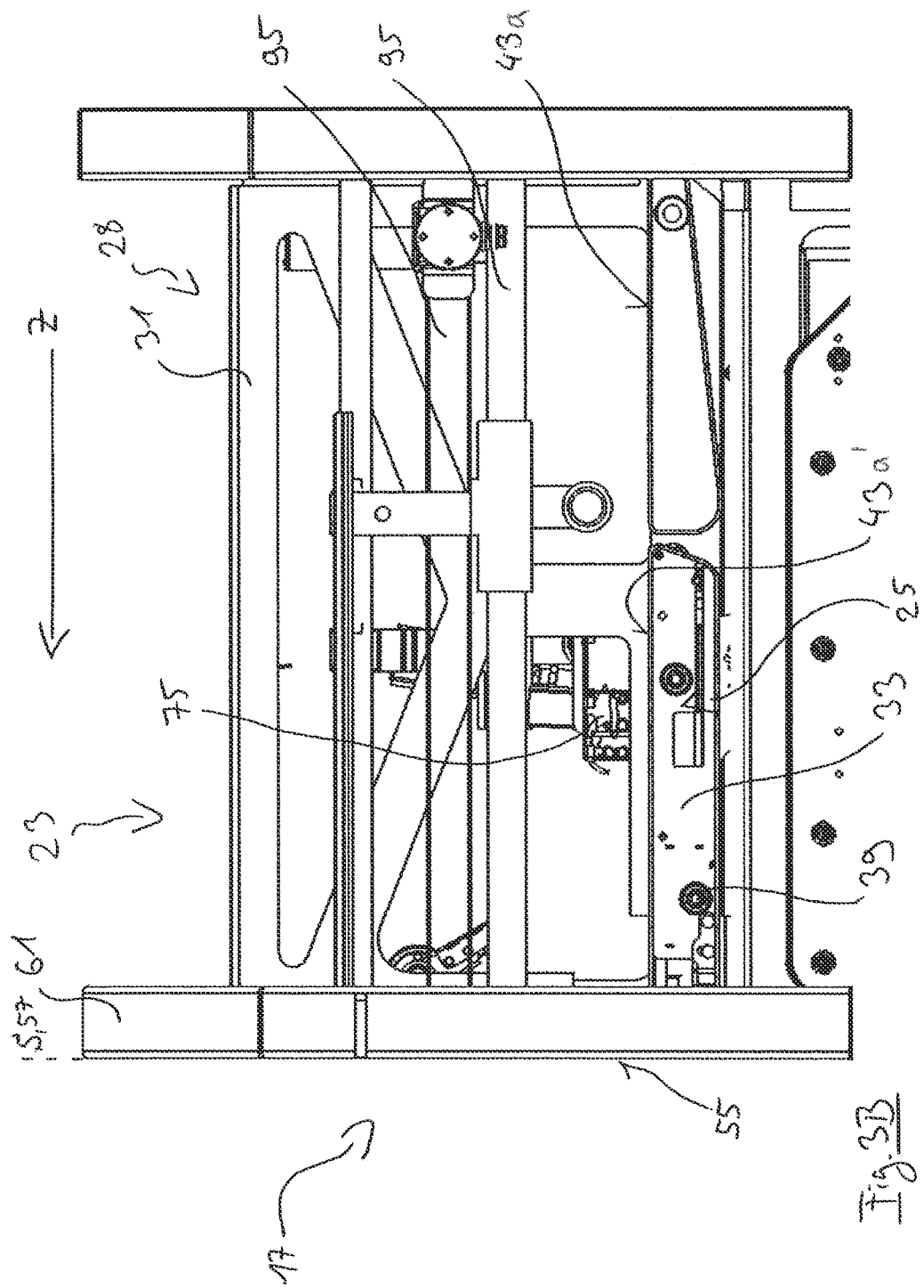

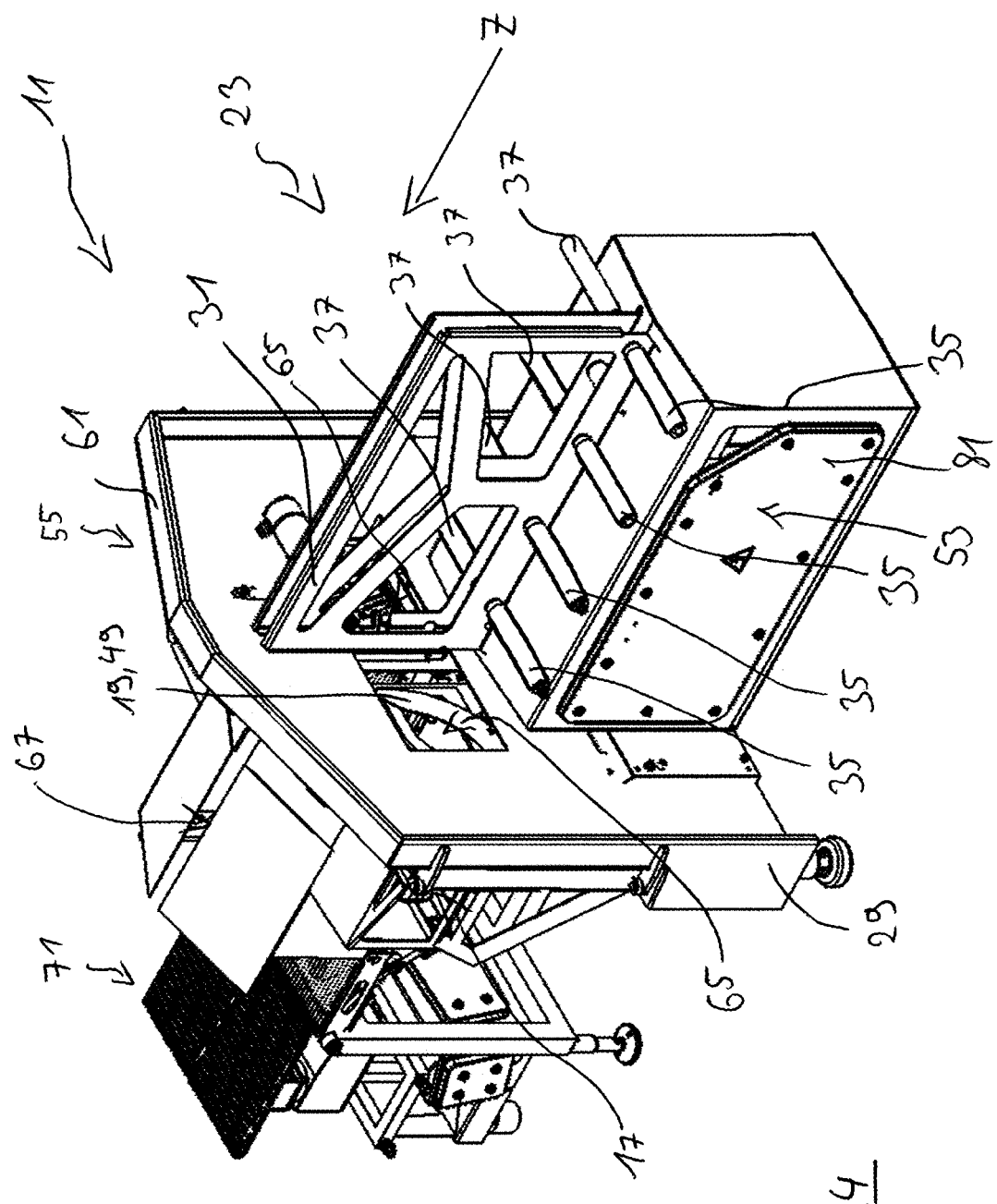

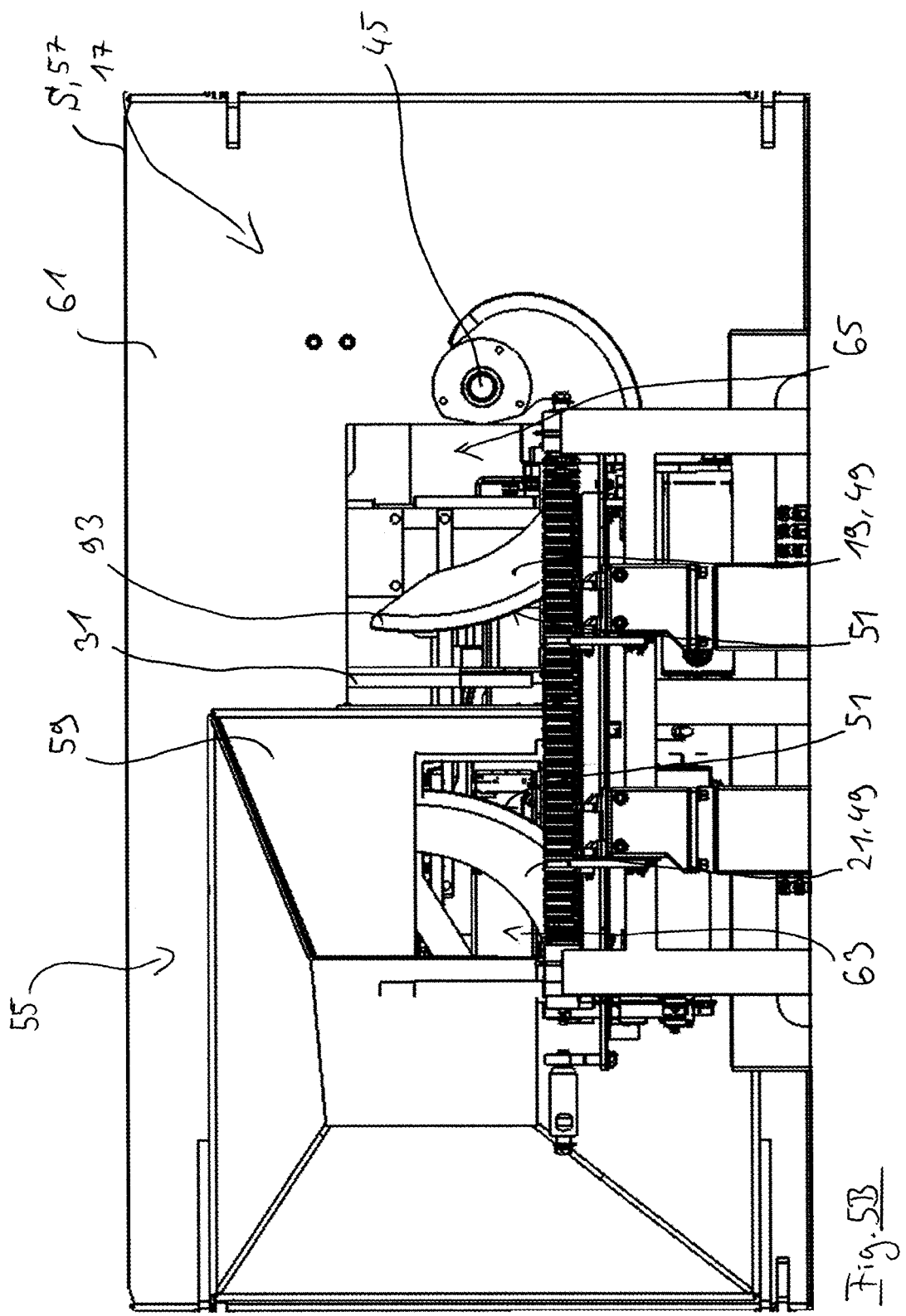

CUTTING APPARATUS

CROSS-REFERENCES TO RELATED APPLICATIONS

This application claims the priority of German Patent Application 102019123487.5, filed on Sep. 2, 2019, and the priority of German Patent Application 102019123999.0, filed on Sep. 6, 2019, each of which is incorporated herein by reference, in their entirety.

BACKGROUND OF THE INVENTION

Field of the Invention

The invention relates to a cutting apparatus for slicing and/or dividing meat products, in particular bacon and/or fresh meat products, having a product feed that is configured to guide at least one first product and at least one second product simultaneously along a feed direction into a cutting region in which slices and/or pieces are cut off from the products.

Furthermore, the invention relates to a method of slicing and/or dividing meat products, in particular bacon and/or fresh meat products.

Related Art

Provision may frequently be made in the course of a processing process of meat products, and in particular of bacon and/or of fresh meat products, to slice or to divide relatively large pieces of natural meat into slices or individual pieces and to offer them for sale in such a manner. For example, before a sale or a delivery to a seller, slices of chops can be produced by a slicing of relatively large rib pieces of an animal and can, if necessary, be put together and/or packaged as a portion that comprises at least one such slice. Provision can likewise be made to divide large roast pieces into partial pieces as required before a sale or also to slice such a meat product into slices to be offered for sale. Bacon may also be offered in portions comprising one or more slices or pieces that were produced by slicing a larger piece of meat or bacon.

To be able to achieve a desired product throughput in such a processing of fresh meat products, the slicing or division of the meat products can take place mechanically by means of a cutting apparatus. In this respect, the products can be loaded onto a product feed and can be automatically guided by it into a cutting region in which slices and/or pieces are cut off from the products. To further increase the product throughput, provision can furthermore be made to feed a plurality of or at least two products simultaneously into said cutting region so that these products can be simultaneously cut into slices and/or pieces.

However, the problem in particular results on the processing of fresh meat products or bacon that extremely high cutting forces and precise cuts are required for a slicing or division of such products to be able to divide products that, for example, include bones in a reliable manner and in particular without the risk of a splintering of the bone or to be able to cut off thin slices from a piece of bacon. Furthermore, such natural products to be processed can have major differences, for example with respect to the structure of the tissue or to the position and thickness of bones, so that an adaptation of the cutting process to a respective product or to different product batches may be necessary. The desired thickness of the slices or size of the pieces that are cut off from a product may in particular also vary in dependence on the respective product type and on the associated manner in which the product is to be offered for sale so that the cutting process can also be adapted to that effect.

Furthermore, an adaptation of the cutting process by processing pieces in one batch that were removed from different halves of an animal may also be necessary on the processing of fresh meat products that are in principle of the same type and correspondingly are to be processed in the same manner, for example, on a processing of rib pieces of an animal. In this respect, the position of a bone can be exactly opposite for products from different halves of an animal so that a cutting process adapted to products of one half of an animal requires exactly the opposite settings for products of the other half.

These difficulties in the processing of meat products, and in particular of bacon and/or fresh meat products, usually require extremely complex and space-intensive designs of the cutting apparatus provided for slicing and/or dividing the products. A desired product throughput, for example, to be able to process products from different halves of an animal or different types of products at the same time can frequently only be achieved by providing a plurality of separate cutting apparatus for processing the products. However, this requires—in addition to the considerable additional costs for the purchase of a further machine—a space that is usually not sufficiently available in practice as well as a complicated and time-consuming sorting and feeding of the products to the individual machines.

SUMMARY OF THE INVENTION

It is therefore an object of the invention to provide a cutting apparatus of the initially named kind that, in a compact design, makes it possible to achieve a flexible cutting process adapted to the requirements for processing such products and a high product throughput.

This object is satisfied by a cutting apparatus having the features of claim 1 and in particular in that, in a cutting region, slices and/or pieces are cut off from the products by means of a first rotating blade and by means of a second rotating blade, wherein the product feed has a first conveying means for guiding the at least one first product into the cutting region and a second conveying means for guiding the at least one second product into the cutting region, wherein the first blade is associated with the first conveying means and is provided for cutting off slices and/or pieces from the at least one first product, and wherein the second blade is associated with the second conveying means and is provided for cutting off slices and/or pieces from the at least one second product.

With respect to the processing of meat products, and in particular of fresh meat products, provision can in this respect be made to cut off relatively thick slices, for example chops approximately 5 cm thick, from the products so that said cut-off slices can also be understood as small pieces of the products. Furthermore, such meat products can also be divided into relatively large, no longer slice-like part pieces, for example, by dividing a roast piece into portions as required. However, meat products such as bacon can also be cut into thin slices that are, for example, intended as a topping, wherein the provided slice thickness may vary in dependence on the use or on the type of the product. For example, so-called streaky bacon can frequently be cut into somewhat thicker slices, whereas back bacon can be cut into thin slices.

The products can be processed completely independently of one another by providing a respective conveying means for the first product and the second product by means of which the first product and the second product are guided into the cutting region and by cutting off slices and/or pieces from the respective products by means of separate blades. For this purpose, the conveying means and the rotating blades can in particular be drivable independently of one another so that the cutting process can be carried out in a specifically adapted manner both for the first products fed by means of the first conveying means and for the second products fed by means of the second conveying means. Thus, a simultaneous and independent cutting operation for meat products or fresh meat products guided on multiple tracks into the cutting region can be achieved with a single and correspondingly compact and space-saving machine design.

For example, different types of products can be simultaneously fed by a respective one of the conveying means into the cutting region and can be processed so that, for example, rib pieces to be processed into chops can be guided into the cutting region by the one conveying means and roast pieces to be divided into pieces can simultaneously be guided into the cutting region by the other conveying means. In this respect, the cutting process can be exactly adapted to the requirements of the fed products by also providing respective associated blades and not only one common blade for dividing the products simultaneously guided into the cutting region. For example, relatively narrow chop slices can be cut off from the first product by means of the first blade, whereas relatively large part pieces in comparison thereto can simultaneously be cut off by the second blade from a second product guided into the cutting region by the second conveying means.

However, it is also possible to operate both conveying means and/or blades synchronously, for example, to be able to simultaneously slice two products and to thereby be able to increase the product throughput. An operation of the cutting apparatus on multiple tracks or two tracks can in this respect in particular be provided in order, for example, to be able to simultaneously process bacon in two tracks and to be able to form portions comprising one or more slices in both tracks. These portions can then, for example, be simultaneously transported away and fed to further processing steps, in particular to a packaging machine for packaging the portions.

Provision can furthermore be made to coordinate the two conveying means and the respective associated blades with one another such that products from different halves of an animal can be simultaneously sliced or divided by means of the cutting apparatus in ideally adapted cutting processes.

For this purpose, the blades can in particular rotate in opposite senses with respect to one another so that the cutting process for products fed by means of the first conveying means and by means of the second conveying means can take place in a mirrored manner to a certain extent. Due to a sorting or an association of the products of different halves of an animal with the respective conveying means, it can thus be achieved that a product having a bone, irrespectively of the half of an animal from which the product was taken, can, for example, always be guided into the cutting region in a radially inwardly disposed or radially outwardly disposed manner with respect to the respective axis of rotation of the blades. An ideally adapted cutting process for products of both halves of an animal can in this respect in particular be achieved with the same settings, such as the same rotational speeds of the blades or the same feed speeds of the products. Due to the design in a single machine, the sorting and loading of the products onto the respective conveying means can take place in an uncomplicated and fast manner.

Furthermore, it can be achieved by such a rotation of the blades in opposite senses that an outwardly directed force is always transmitted from the respective blade to the cut-off slices and/or pieces so that the slices and/or pieces of one product are not accelerated in the direction of the respective slices and/or pieces cut off from the other product. This can in particular facilitate the placement of the slices and/or pieces and a possible overlap of the slices and/or pieces of two simultaneously processed products can be prevented. In addition, small pieces or snippets that are, for example, produced on a slicing of bacon can be hurled outwardly by such a blade rotation and can, for example, be collected in a collection region to be able to remove or dispose of these snippets. Such snippets can thereby in particular also be prevented from entering a region in which the portions of the product processed by means of the respective other blade are formed so that the finished portions can be fed free of such snippets to further processing steps and, for example, to a packaging machine.

Due to the possibility of processing at least two products independently of one another and simultaneously with a single machine design, the number of components necessary for such an independent operation and, correspondingly, the space requirement of the cutting apparatus can be minimized. In this respect, specific functions or components that generally have to be provided a multiple of times in an independent operation with a plurality of machines can be jointly provided for the products fed by means of the first conveying means and the products fed by means of the second conveying means and a compact arrangement can be achieved. The cutting apparatus can in particular, for example, have a common and compact housing for both conveying means and both blades and the blades can be shielded by a common access protection. Furthermore, a common control device or a common switch cabinet can be provided for the arrangement of the electronic components of the cutting apparatus or for common motors, for example, for driving the blades.

Since the conveying means can in particular be drivable independently of one another and can generally be loaded with products independently of one another, only one of the conveying means can also be used to guide products into the cutting region in specific operating situations. This can, for example, be provided in the case of a low utilization of the cutting apparatus or in the case of specific product batches that, for example, only comprise products from one half of an animal. Similarly, it is also possible to feed two or more products simultaneously on one conveying means and, for example, disposed next to one another into the cutting region in order to simultaneously slice or divide a plurality of products by means of one or both blades. The product throughput can thereby also be increased, in particular for relatively narrow products.

The arrangement of two conveying means consequently does not require an exclusively two-track operation, i.e. a plurality of tracks, in each of which a product is processed, can be associated with a respective conveying means.

The conveying means can furthermore in particular have a support surface for the products that can, for example, be formed by a sliding surface or by a conveyor belt. Furthermore, the product feed can have a feed means and/or a guide means, such as a product holder, by means of which the products can, for example, be held and guided in a rear region during a feed into the cutting region. Such a product holder can in particular serve to briefly stop or interrupt the feed of the products to enable a transporting away of formed slices and/or pieces. In addition, an end piece of a product that is not suitable for forming a slice or a piece can be removed by means of a product holder. Furthermore, such a product holder can be provided in the case of a conveying means formed with a sliding surface in order to effect the feeding of the products on the sliding surface into the cutting region.

However, in particular in the case of a cutting apparatus for processing bacon, provision can also be made to simultaneously feed a plurality of products directly contacting one another to the respective associated blade by means of the conveying means, wherein slices and/or pieces can always be cut off from the front product end of the front product. In this respect, the conveying means can in particular also be configured as conveyor belts, for example as belts or straps running around continuously, and the above-mentioned product holders can be omitted.

In particular in the case of bacon, end pieces that, for example, have to be sorted out by means of a product holder for other products can generally also be processed and can, for example, form a part of a portion. In this respect, a scale can be arranged in a portioning region of the cutting apparatus to be able to recognize a cut-off end piece or a portion having such an end piece or a slice cut off from an end piece that can in particular have a lower weight in the case of a number of slices and/or number of pieces provided for a respective portion. A further slice and/or a further piece can, for example, be added to such a portion by only feeding or transporting away the portion to or from possible further processing steps after at least a first slice or a first piece of the following product has been cut off and a desired weight has been achieved. Alternatively to this, a portion having an end piece and/or having a slice of an end piece and/or the end piece can be fed to a further processing process. For example, the portion and/or the end piece can be sliced or divided by means of a cutting machine suitable for this purpose into small cubes or pieces of irregular shape that can likewise be packaged and offered for sale.

Further possible embodiments can be seen from the dependent claims, from the description, and from the drawing.

In some embodiments, the first conveying means and the second conveying means can extend next to one another offset in parallel along the feed direction. Due to this parallel alignment of the conveying means, a narrow design of the product feed and of the total cutting apparatus can in particular be achieved. Furthermore, such a parallel alignment of the conveying means and a corresponding arrangement of the blades can enable a symmetrical design of the cutting apparatus so that in particular both the conveying means and the blades as well as further devices, for example for suspending and fixing the conveying means, can be of similar design and can be arranged with only an opposite orientation. This can enable a modular design of the cutting apparatus with similar and prefabricated components so that in particular an assembly of the cutting apparatus or a dismantling of individual components, for example for cleaning or maintenance, can also be simplified and accelerated.

Furthermore, an access at both sides to the product feed can be achieved by a parallel alignment of the conveying means along the feed direction so that products can be flexibly loaded onto the respective conveying means. This can enable a simple sorting of the products that can be carried out quickly. Alternatively, in a parallel design, it is also possible to provide a possibility of access to the product feed at only one side and to arrange a wall element as access protection at the oppositely disposed side, for example.

Provision can be made that both the first conveying means and the second conveying means as well as the first blade and the second blade are arranged in mirror symmetry with one another with respect to a separation plane extending between the conveying means, wherein the conveying means can in particular be aligned offset in parallel with one another along the feed direction. The feed direction and a direction perpendicular to a surface on which the products guided into the cutting region are disposed can in particular extend in the separation plane. Such a mirror-symmetrical design of the cutting apparatus can in particular make it possible to process substantially opposed products, for example products from different halves of an animal having an opposite orientation of bones, at the same time with the same settings of the cutting process and ideally adapted by an association of the products with respective conveying means. The blades arranged in mirror symmetry with one another can in this respect in particular be set into rotations in opposite senses to be able to slice and/or divide products fed by means of the first conveying means in the same manner as products oriented oppositely thereto and fed by means of the second conveying means.

The product feed can comprise a common support structure for the conveying means, with the support structure in particular being able to be fixedly connected to a frame supported on the ground. The conveying means can thus be attached to a common structure to enable a narrow and compact design of the cutting apparatus. Furthermore, by fixing the support structure to a frame supported on the ground, it can be achieved that no relative movement of the support structure or of the conveying means held thereat takes place with respect to the frame, but rather that the conveying means are held in a predefined position. This can enable a reliable positioning of the conveying means for guiding the products into the cutting region, wherein this positioning can in particular be selected such that the conveying means are laterally accessible in a simple manner to load products, for example.

In some embodiments, the support structure can have a center support that extends in the feed direction and that is arranged between the first conveying means and the second conveying means, with the first conveying means and the second conveying means being held at the center support.

The center support can thus to a certain extent form a central structure of the product feed at which the conveying means are held. In this respect, the conveying means can in particular be arranged offset in parallel with one another with respect to the feed direction and can be connected to the center support at respective opposite sides thereof. Accordingly, the center support can also define the already mentioned separation plane or can extend within it so that a mirror-symmetrical and compact design of the cutting apparatus with respect to the center support can result.

It can be achieved by such a center support extending in the feed direction and carrying the conveying means that the product feed and correspondingly also the cutting apparatus overall mainly extend along the feed direction. Thus, a narrow design of the cutting apparatus with respect to a direction perpendicular to the feed direction can be achieved.

Provision can be made that further components of the cutting apparatus, in particular electronic components for driving the conveying means and/or the blades as well as for controlling the conveying means and/or the blades, are arranged in the region of the center support and/or beneath the conveying means. Since the components for controlling and driving the blades and the conveying means can also be arranged in a central region of the product feed or beneath the conveying means, the space available there that is anyway occupied by the product feed can be used to achieve a compact design of the cutting apparatus. An extent of the cutting apparatus or of the product feed perpendicular to the feed direction can thereby in particular be minimized. A blocking or disruption of the access to the conveying means, for example to load products, can also be avoided by the arrangement of such components in a central region or beneath the conveying means.

Provision can be made that the first conveying means and the second conveying means comprise respective base parts that are selectively connectable to or releasable from the center support. For example, the conveying means can have a conveyor belt that runs around continuously and that is guided via two deflection rollers that are supported in such a base part. Equally, a conveying means configured as a sliding surface and optionally formed with a feed means can be connected to such a base part or can have a section that functions as a base part and that is connectable to the center support.

Since the base parts are selectively connectable to or releasable from the central part, the conveying means can be inserted into or removed from the product feed in a simple manner. Due to this simple possibility of attaching and releasing the conveying means, a cleaning of the conveying means can in particular be carried out in a simplified and accelerated manner in that the time requirement for these assembly and dismantling steps can be minimized.

The hygiene regulations to be observed with respect to the processing of meat products, and in particular of fresh meat products, can thereby be met without the regularly required cleaning of the conveying means and the removal necessary therefor and the subsequent connection of the conveying means to the product feed causing relevant operating interruptions. Furthermore, a modular design of the product feed can be achieved by the provision of such base parts so that, for example, one conveying means can be exchanged in a simple manner with another conveying means of the same type to be able to continue the cutting operation during a cleaning of the one conveying means.

The center support can have at least one first mandrel which extends perpendicular to the feed direction and onto which the first conveying means can be plugged, and the center support can have at least one second mandrel which extends perpendicular to the feed direction and opposite to the first mandrel and onto which the second conveying means can be plugged.

In this respect, the conveying means can in particular have base parts that can be plugged onto the respective mandrels. For example, bores through which the respective mandrels can be guided can be designed in the base parts for this purpose. The center support can in particular have at least two first mandrels and at least two second mandrels to support the base parts of the conveying means safely and stably and to prevent a tilting of the conveying means.

Since the conveying means can be plugged onto mandrels in a simple manner for a selective connection to the center support, an attachment or a removal of the conveying means can take place in a fast and simple manner. Both the assembly of the product feed and a change of the conveying means or a removal, for example for a cleaning, can thus be carried out in a quick and uncomplicated manner.

The opposite orientation of the first mandrels and the second mandrels with respect to one another in turn enables a symmetrical or mirror-symmetrical design of the cutting apparatus with respect to a separation plane defined by the center support, with the conveying means being arranged offset in parallel from one another at opposite sides of the center support. A narrow design of the product feed can likewise be achieved in that the conveying means mainly extending in the feed direction can be plugged onto relatively short mandrels so that the extent of the conveying means perpendicular to the feed direction can ultimately be substantially predefined by the width of the products to be processed.

Provision can be made that the conveying means plugged onto the respective mandrels can be fixed to the center support by respective fixing means. For this purpose, the mandrels can, for example, be designed with threads onto which fixing elements can be screwed to prevent the conveying means from slipping off from the mandrels. Fixing elements that can be plugged onto the mandrels can also be provided. The conveying means can thereby in particular during operation be reliably connected to the center support and to the holding structure, wherein the fixing means can furthermore serve to arrange the conveying means in a predefined position after a plugging onto the mandrels and to ensure their correct positioning. The fixing devices can in particular be operable without tools to enable a simple attachment to the mandrels.

In some embodiments, the product feed can comprise a first drive for the first conveying means and a second drive for the second conveying means, by means of which drives the first conveying means and the second conveying means are drivable independently of one another.

Due to the possibility of being able to drive the first conveying means and the second conveying means independently of one another, the cutting processes provided for the first product and the second product can also be carried out completely independently of one another. Different types of products can thereby in particular be cut into slices and/or pieces by the first blade and the second blade, wherein pieces or slices of different sizes can in particular be cut off from the products by the independent drives of the first conveying means and of the second conveying means— irrespectively of whether the products are of the same type or of different types. Furthermore, due to the independent driving of the two conveying means, it is also possible, depending on the situation, to use only one of the conveying means for guiding products into the cutting region, whereas the other conveying means that is not used is not driven.

To implement such an independent driving of the conveying means, an associated motor can be provided for each of the conveying means. Similarly, only one motor can be provided to drive the conveying means, wherein a desired portion of the drive power can, for example, be directed to the respective conveying means by respective couplings. The drives of the conveying means, which can, for example, comprise so-called drum motors, can in particular be arranged in a base part of the conveying means, in particular in a deflection axle, rotationally driven by means of the drive, for a conveyor belt of the conveying means so that the necessary construction space for the arrangement of the drives can be minimized.

In some embodiments, the product feed for the first conveying means and/or for the second conveying means can comprise at least one respective product holder that is configured to hold the first product and/or the second product in a rear product section during the guidance into the cutting region.

Such a product holder can hold the first product or the second product, guided into the cutting region by means of the respective conveying means, in an end region and can thereby support the guidance into the cutting region. In this respect, in particular in the case of conveying means that have a conveyor belt that runs around continuously, such a product holder can be provided to achieve a feed of the first product and the second product independently of one another. Furthermore, the respective held product can, for example, be briefly retracted or stopped by means of a product holder to briefly interrupt the guidance into the cutting region and, for example, to enable a transporting away of an already cut slice or of an already cut-off piece or of portions formed therefrom. Furthermore, such a product holder can also be provided to carry out the feeding of the products into the cutting region in the case of a conveying means formed with a sliding surface. A conveying means formed with a sliding surface for the products can in particular itself also comprise such a product holder and/or a product pusher for feeding the products into the cutting region.

In some embodiments, the feed direction can extend at least substantially horizontally and the blades can define a respective vertically oriented cutting plane.

Such a horizontal feeding of the products into the cutting region can make it possible to feed the products sufficiently far into the cutting region to be able to cut off relatively large pieces or thick slices. In this respect, it can be avoided that such a further feeding of the products into the cutting region, such as is possibly the case with a feed inclined with respect to the horizontal, is blocked by a surface not arranged in parallel, for example horizontally, with the feed direction for collecting the cut-off slices and/or pieces. Furthermore, a product which has been advanced far and of which a large or long section is correspondingly no longer supported by the conveying means directly before a cut, can already be disposed on and supported by a likewise horizontally oriented surface for collecting the cut-off slices and/or pieces in order, for example, to prevent a bending of the product. Such a surface for collecting the products can in particular form a portioning region and can be configured as a conveyor belt to transfer the cut-off slices and/or pieces or portions formed therefrom to possible devices arranged downstream.

The respective cutting planes defined by the blades can in particular be disposed in a common plane so that the blades can be arranged at the same height with respect to the feed direction. Alternatively, provision can be made that the blades are in particular arranged slightly offset in parallel with one another and correspondingly define cutting planes offset in parallel. Similarly, possible placement regions or portioning regions in which the slices and/or pieces of the first or second product are collected or caught can also be arranged at the same height or offset from one another relative to the respective cutting places and correspondingly with respect to the feed direction.

With respect to a respective axis of rotation about which the blades rotate in operation, the blades can in particular be arranged slightly offset in parallel with one another in an axial direction and can be arranged in a radial direction such that the blades can at least sectionally overlap during a rotation. The spacing between respective blade mounts in which the blades are held can in particular be smaller in the radial direction than twice the maximum radial extent of the blades. The parallel offset of the blades in this respect makes it possible to arrange the blades—in particular with inwardly directed blade tips if the blades are configured as one-armed scythe-like blade having narrow knife blades—as sectionally overlapping one another and with the smallest possible spacing from one another in the radial direction to be able to configure the cutting apparatus as narrow and space-saving.

Alternatively to a horizontal feeding of the products, provision can furthermore be made in some embodiments that the feed direction extends in an inclined manner. The blades can define a respective cutting plane that extends at least substantially perpendicular to the feed direction. Such an inclined feed direction can in particular be provided on a processing of bacon to be able to achieve a controlled placement of the cut-off slices.

Provision can furthermore be made that the inclination of the conveying means is variable. The conveying means can, for example, be pivotable for this purpose. The orientation of the blades can in this respect be adapted to the inclination of the conveying means so that the blades always define a cutting plane perpendicular to the feed direction in which the blades rotate. The flexibility with respect to the use of the cutting apparatus can also thereby be increased further since, for example, a horizontal orientation of the conveying means can be selected on a division of the products into relatively thick slices or pieces, whereas an inclined feed direction can be set on a cutting off of thinner slices for an improved placement of the slices. Provision can furthermore be made to carry out the loading of the conveying means with products in a horizontal orientation of the feed, whereas the cutting process can take place with an inclined feed direction.

In some embodiments, the first blade can be held in a first blade mount and the second blade can be held in a second blade mount, wherein the first blade mount and the second blade mount can be set into rotations in opposite senses with respect to one another. Respective drives that are controllable independently of one another and that in particular have respective electric motors can in this respect be provided to set the blade mounts into rotation. The blades can be held in mirror symmetry with one another in the blade mounts with respect to a separation plane that extends between the conveying means and that is in particular defined by said center support so that similar products from different halves of an animal can, for example, be fed to a respective one of the blades by the rotations in opposite senses and all the products can be sliced in the same manner by this sorting.

The first blade and the second blade can be configured as one-armed scythe-like blades having narrow curved knife blades. Such a one-armed blade can in particular be held at a blade mount at one of its ends so that the blade makes only one cut during a rotation.

Due to the configuration of the blades with narrow knife blades, a low weight of the blades can be achieved, which can in particular make it possible to accelerate the blades during a rotation in order to generate sufficient cutting forces or to decelerate said blades in order to release the cutting region for a sufficiently long period of time for a feeding of the products. The curvature of the blade or of its blade edge can in this respect in particular be selected such that, on a rotating movement of the blade for cutting a product, the knife blade is pulled along the product in every rotational position, where possible, so that a pulling cut takes place. A precise cutting off of a slice or of a piece can thereby be achieved and the required cutting forces can be minimized, in particular in comparison with a chopping movement of the blade.

In some embodiments, the first blade and the second blade can have a respective blade edge that is at least sectionally of spiral shape, with the blade edge in particular extending at least sectionally in the shape of an Archimedean spiral and/or extending at least sectionally in the shape of a logarithmic spiral.

Due to such a blade edge extending curved in a spiral shape, it can in particular be achieved that a pulling cut through the product to be sliced takes place during a rotation of the respective blade in every rotational position. The blade edge can in this respect, starting from an end held in a blade mount, in particular merge into a logarithmic spiral, starting from an Archimedean spiral, to achieve a smooth and pulling cut.

Provision can be made that the first blade and the second blade have a respective at least sectionally toothed blade edge. Such a blade edge can in particular be suitable for precisely cutting or dividing meat products rich in fiber and/or having bones into slices and/or pieces, which is frequently necessary particularly for the processing of fresh meat products. In this respect, the blade edges of the blades can have continuous and uniform toothed arrangements or they can also only be toothed in sections or can be formed with varying toothed arrangements. For example, a toothed arrangement of the blade edge can only be provided in a section of the blade edge that, during the rotation of the blade, passes through a region in which the position of a bone of a product to be sliced is to be expected.

Alternatively to a configuration of the blades as one-armed scythe-like blades having narrow knife blades, provision can also be made that the blades are configured as scythe-like blades having relatively wide knife blades. Furthermore, a configuration of the blades as circular blades is possible, for example. The blades can moreover have a smooth blade edge. The blades can in particular be exchangeable or replaceable so that, for example, a respective blade ideally adapted to a product to be processed can selectively be insertable into the blade mounts, for example. Provision can, for example, be made to insert a scythe-like blade having a wide knife blade and a smooth blade edge into the blade mount for the slicing of bacon, whereas one-armed scythe-like blades having narrow knife blades and sectionally toothed blade edges can be provided for slicing fresh meat products containing bones.

In some embodiments, a control device can be provided for controlling the rotational speeds of the rotating blades, with the control device being configured to accelerate and/or decelerate the rotations of the blades during a revolution for cutting off a slice and/or a piece. The control device can in this respect in particular be configured for an independent control of the rotational speeds of the blades. For example, the control device can comprise a microprocessor and/or a CPU (central processing unit) or can be configured as such. The control device can also be configured to control further components of the cutting apparatus, for example, the feed and/or the conveying means.

Since the rotational speeds of the blades are variable during a revolution, sufficient time for feeding a product into or through the cutting region before the blade engages into the product and cuts off a slice and/or a piece can in particular be obtained by a deceleration of one of the blades. This makes it possible to feed products relatively far into the cutting region in order to be able to cut off relatively thick slices or large pieces, for example, roast pieces as required. Due to the possibility of accelerating the blades again after a deceleration during a rotation, the forces required for slicing a meat product, and in particular a fresh meat product possibly containing bones, can nevertheless be generated. For this purpose, the blades can in particular be configured as one-armed scythe-like blades having narrow curved knife blades and a correspondingly low weight so that inertia forces that are as low as possible are to be overcome during a deceleration or an acceleration of the blades. However, provision can also be made to operate the blades at constant rotational speeds.

In some embodiments, a blade guide can be arranged in the cutting region and has a respective peripheral gap for the blades that is defined by a front boundary with respect to the feed direction and by a rear boundary with respect to the feed direction.

The respective peripheral gap and its boundaries thus form a guide for the blades with respect to the feed direction and the blades run around in the peripheral gap so that the cutting planes defined by the blades are also disposed in the peripheral gap. Due to the restriction of possible blade movements in the feed direction or of the guidance of the blade by the front and rear boundaries, a safe guidance and a straight cut can even be achieved at high cutting forces during a slicing of a product. Furthermore, it is possible to counteract an evasion or a canting of the blades due to possible force peaks or blows that occur during the cutting. In particular if the blades run around in a common cutting plane, the blade guide for the blades can have a common peripheral gap. Furthermore, the front and rear boundaries can be formed at a common component for the blades or at respective separate components.

Alternatively to this, the blade guide can have a respective peripheral gap for each blade, wherein the peripheral gaps can in particular be arranged offset in parallel from one another.

The front boundary and the rear boundary can have mutually aligned passages for the first product and/or for the second product. In this respect, the front and rear boundaries can form a frame-like border of the respective passages through which the products can be guided into the cutting region. The front boundary can in this respect in particular form a blade edge that can be configured as a so-called cutting screen due to the frame-like formation of the passage and as such can so-to-say form the end of the product feed.

In some embodiments, the first blade and/or the second blade can cover the maximum clearance of the passages during a rotation. It can thereby be achieved that the blades are surrounded by the front and rear boundaries during the total rotation or during the total cut both in the direction of the end to which a blade mount of the respective blade is connected and in the direction of the end which forms the blade tip and are guided and stabilized in the feed direction by said front and rear boundaries. It can thus be avoided that the blade tip, for example, stands freely in the passage during a cut and that possible forces acting on the blade in the feed direction can always be led off to the boundaries at two ends. A possible bending, evasion or tilting of the blade during a cut can thus be counteracted by this support at both sides.

In some embodiments, the cutting apparatus can have a portioning region in which portions that comprise at least one slice and/or at least one piece are formed from the cut-off slices and/or pieces. Such a portioning region can in particular directly adjoin or directly merge into the cutting region, wherein the cut-off slices and/or pieces can be placed on the portioning region and can, for example, be combined to form a portion. The portioning region can comprise at least one conveyor belt by means of which the complete portions can in particular be transferred to a conveying device arranged downstream to be able to feed the portions to further processing steps and, for example, to a packaging machine.

Furthermore, a scale for determining a portion weight can be arranged in the portioning region. Such a scale can in particular enable a recognition of end pieces and/or of portions comprising end pieces in order, for example, to be able to sort them and/or feed them to a separate processing. Furthermore, the scale can serve for a process control, for example, by continuing the portion formation until the portion reaches a predetermined desired weight, whereupon the portion can be transferred to the conveying device arranged downstream. For this purpose, the scale can, for example, be connected to a control device of the cutting apparatus and/or of the portioning region.

The invention further relates to a method of slicing and/or dividing meat products, in particular fresh meat products, wherein at least two products are fed along a feed direction into a cutting region in a cutting apparatus—in particular in a cutting apparatus as disclosed herein—in which slices and/or pieces are cut off from each of the at least two products by means of at least one respective rotating blade.

Due to the feeding of at least two products into the cutting region, wherein slices and/or pieces are cut off from the products by means of respective associated blades, two products can in particular be simultaneously sliced independently of one another and in a manner ideally adapted to the respective product. This can make it possible to achieve a high product throughput on a slicing and/or division of meat products with a simultaneous ideal adaption of the cutting process to the respective products.

The at least two products can be guided into the cutting region by means of respective conveying means arranged offset in parallel with one another. The parallel arrangement of such conveying means that are in particular drivable independently of one another can enable a narrow design of the cutting apparatus, wherein a completely independent cutting process can be achieved by associating the products with a respective conveying means and with a respective blade.

Provision can be made that the products are guided along a horizontal direction into the cutting region, with the blades rotating in a respective vertically oriented cutting plane. Alternatively to this, provision can be made that the products are guided along an inclined direction into the cutting region. The blades can in particular rotate in a respective cutting plane that is oriented perpendicular to the direction in which the products are guided into the cutting region.

Provision can be made that the blades are accelerated and/or decelerated during a rotation for cutting off a slice and/or a piece. In this respect, the deceleration of the blade can enable a product to be pushed far into the cutting region so that a relatively large piece or a relatively thick slice can thereupon be cut off. Due to the possibility of accelerating the blade again after a deceleration, the cutting forces required for slicing the meat products can in particular be generated despite the rotation speed that has slowed down in the meantime. However, provision can generally also be made that the blades rotate at a substantially constant speed during the operation.

Portions that comprise at least one slice and/or one piece can be formed from the cut-off slices and/or from the cut-off pieces, with the formed portions in particular being able to be conveyed onward by means of a conveying device arranged downstream. The portions can in this respect in particular be formed in a movable portioning region that can, for example, have a conveyor belt running around in the feed direction to be able to transfer the completely formed portions to a conveying device arranged downstream. Furthermore, the portion formation can be directly influenced by a movable portioning region in that the spacing of the slices and/or pieces of a portion can, for example, be changed or adapted by a pulling forward of the portioning region in the feed direction. Provision can also be made that the portioning region can be moved in further directions, for example perpendicular to the feed direction, in order e.g. to be able to form overlapping or stack-like portions in this transverse direction.

The conveying device arranged downstream can in particular feed the formed portions to further processing steps. For example, the conveying device can feed the formed portions to a packaging machine arranged downstream and can place them into or onto packaging spaces provided for this purpose—for example, into recesses produced in a film web by deep drawing or into separate packaging parts, e.g. so-called trays—so that the portions comprising at least one slice or at least one piece can be delivered completely packaged to a customer or a seller.

BRIEF DESCRIPTION OF THE DRAWINGS

The invention will be described in the following purely by way of example with reference to an embodiment and to the drawings. There are shown:

FIGS. 1A and 1B a side view or a plan view of a processing line for processing meat products using a cutting apparatus;

FIGS. 2A and 2B a perspective rear view or a perspective front view of the cutting apparatus;

FIGS. 3A and 3B a plan view or a side view of a product feed of the cutting apparatus;

FIG. 4 a perspective rear view of the cutting apparatus with the conveying means of the product feed removed and the frame removed; and FIGS. 5A and 5B front views of a cutting region for illustrating the arrangement of a first blade and a second blade and their design.

DETAILED DESCRIPTION OF AN EMBODIMENT OF THE INVENTION

Figure 5A:
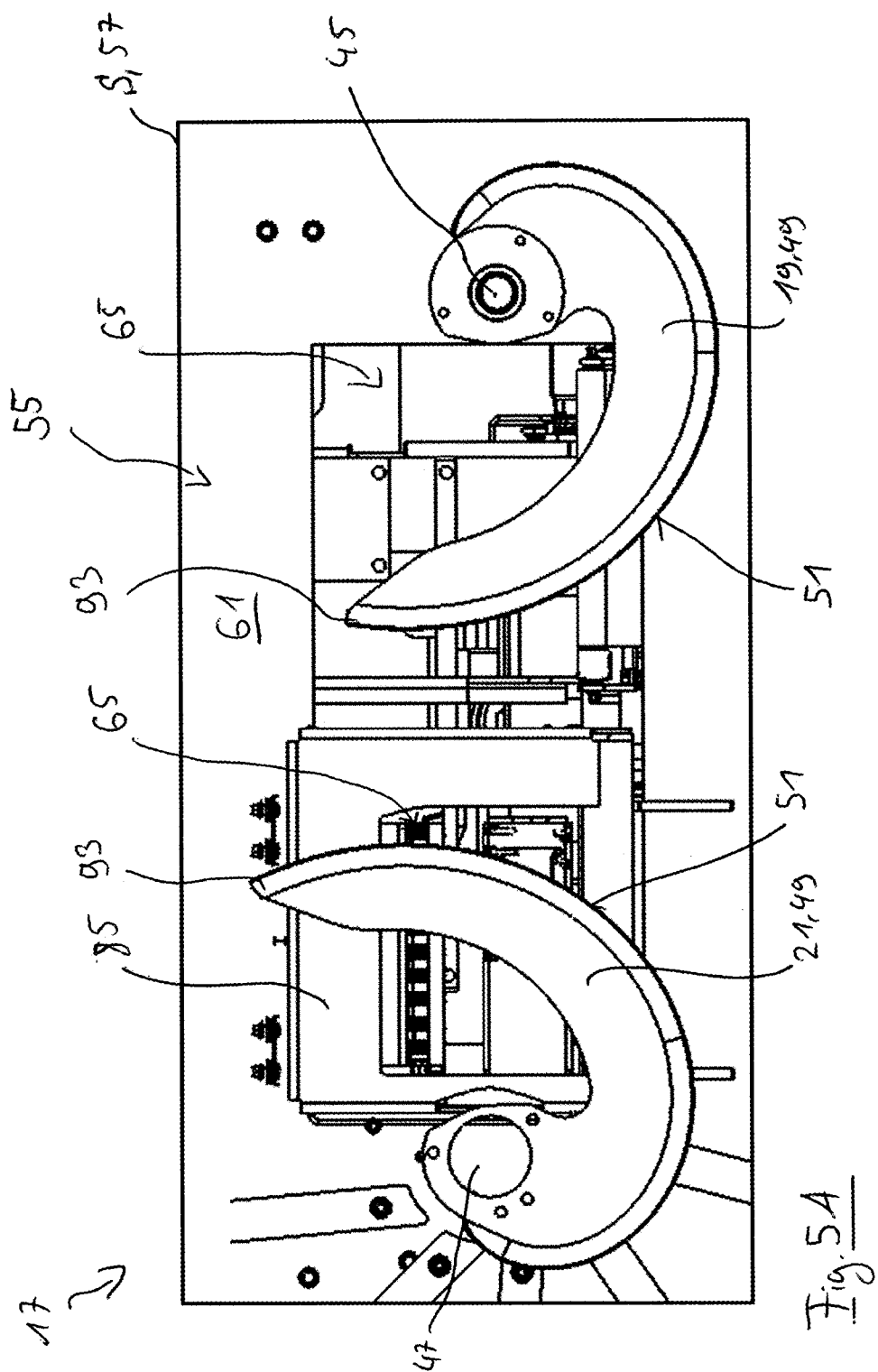

FIGS. 1A and 1B show views of a processing line 87 for processing meat products and in particular fresh meat products or bacon. In this respect, products 13 and 15 shown in FIGS. 1A and 1B, but not in FIG. 3A, are fed along a feed direction Z to different stations at which processing steps take place.

The products 13 and 15 can be loaded onto a feed 83 that has a conveyor belt 73 running around in the feed direction Z. By pulling forward this conveyor belt 73 of the feed 83, the products 13 and 15 move into an introduction section 89 which is formed by a further conveyor belt 73' and in which an introduction device 91 is arranged. Said introduction device is configured to introduce the products 13 and 15 into a press 77 by a movement perpendicular to the feed direction Z. The products 13 and 15 that as natural products initially usually have an irregular shape can be compressed by means of the press 77 and can thereby be brought into a predefined shape or a shape required for further processing steps.

The pressed products 13 and 15 are fed from the press 77 to a distribution and sorting device 79 that has a conveyor belt 73" running around in a feed direction Z. In this respect, the distribution and sorting device 79 is configured to move this conveyor belt 73" perpendicular to the feed direction Z to transfer the products 13 and 15 to a first conveying means 25 or to a second conveying means 27 of a product feed 23.

This product feed 23 forms a part of a cutting apparatus 11 for slicing and/or dividing the products 13 and 15 into slices and/or pieces that will be described in more detail in the following.

The product feed 23 is configured to feed the products 13 and 15 to a cutting region 17 in which slices and/or pieces are cut off from the products 13 and 15 by means of blades 19 and 21 rotating in a cutting plane S (cf. FIGS. 2B, 5A and 5B). In this respect, at least one first product 13 can be guided into the cutting region 17 by means of the first conveying means 25, while, simultaneously therewith, at least one second product 15 can be guided into the cutting region by means of the second conveying means 27. Furthermore, the first blade 19 is associated with the first conveying means 25 and is provided to cut off slices or pieces from the first product 13, whereas the second blade 21 is associated with the second conveying means 27 and is provided to cut off slices or pieces from the second product 15.

To guide the products 13 and 15 into the cutting region 17, both the first conveying means 25 and the second conveying means 27 comprise two respective conveyor belts 43a, 43a' and 43b, 43b' that run around in the feed direction Z (cf. in particular FIGS. 2A and 3A). The conveying means 25 and 27 in this respect substantially extend in the feed direction Z and are arranged offset in parallel from one another so that a narrow design of the product feed 23 can be achieved.

The conveyor belts 43a, 43a', 43b, 43b' of the conveying means 25 and 27 are held on respective base parts 33 that comprise respective drives 39 and 41 of the conveying means 25 and 27. An independent guidance of the first products 13, which are guided into the cutting region 17 by means of the first conveying means 25, and the second products 15, which are guided into the cutting region 17 by means of the second conveying means 27, can be achieved by these drives 39 and 41. For example, first products 13 and second products 15 of different types can in particular be simultaneously fed into the cutting region 17 and pieces of different sizes or slices of different thicknesses can be cut off from the products 13 and 15 as required. For this purpose, the conveying means 25 and 27 can, for example, be operated at respective adapted speeds to guide the products 13 and 15 sufficiently far and independently of one another into the cutting region 17 before a cutting off of a slice or of a piece, taking into account the respective desired slice thickness.

Since respective blades 19 and 21 are associated with the conveying means 25 and 27, a completely independent cutting process can be achieved for the products 13 and 15. This can make it possible to simultaneously process at least two products 13 and 15 by means of the cutting apparatus 11 and to achieve a correspondingly high product throughput, wherein the cutting process can be take place ideally adapted to the respective product 13 or 15 despite this simultaneous processing.

To support or to monitor the guidance of the products 13 and 15 into the cutting region 17, the product feed 23 further comprises product holders 75 for the conveying means 25 and 27, wherein only the product holder 75 associated with the second conveying means 27 is shown in the Figures. These product holders 75 are configured to hold the products 15 or 13 in a rear region (cf. FIG. 3A) and can in particular serve to briefly withdraw or stop the products 15 or 13 to interrupt the feed into the cutting region 17 and to enable a transporting away of already formed slices and/or pieces. To enable a permanent engagement of the product holders 75 into the provided end regions of the products 13 and 15 during their guidance into the cutting region 17, respective guides 95 are provided in which the product holders 75 can, for example, be moved in and against the feed direction Z by means of spindle drives arranged within the guides 95. These guides 95 are in this respect arranged above the conveyor belts 43a, 43a', 43b, 43b' so that these guides 95 also do not increase, or at most slightly increase, the extent of the product feed 23 perpendicular to the feed direction Z (cf. also FIG. 3B) so that the width of the cutting apparatus is hereby not unnecessarily increased. Embodiments without product holders 75 are generally also possible, however. Provision can in particular be made for the processing of bacon to merely guide the products 13 via the conveyor belts 43a, 43a', 43b, 43b' into the cutting region 17.

In the embodiment shown, the feed direction Z extends horizontally, wherein the cutting plane S defined by the blades 19 and 21 is vertically aligned. Due to this horizontal guidance of the products 13 and 15 into the cutting region 17, a further feed of the products 13 and 15 through the cutting plane S can be made possible to be able to cut off relatively thick slices or large pieces, which can in particular be desired for the processing fresh meat products, from the products 13 and 15.

Alternatively to this, an inclined feed direction Z can, however, also be provided, for example, in that a rear deflection of the conveying means 25 and 27 or of the conveyor belts 43a, 43a', 43b, 43b' can be arranged higher than a deflection facing the cutting region 17. A controlled placement of the slices can in particular be achieved on a cutting off of relatively thin slices.

As in particular FIG. 2B shows, a portioning region 67 is arranged downstream of the cutting plane S, in which portioning region 67 the cut-off slices or pieces of the products 13 and 15 are collected and portions are formed that comprise at least one slice or one piece. Said portioning region has a conveyor belt 73''', comprising a plurality of straps and running around in the feed direction Z, for each of the products 13 and 15, wherein only the conveyor belt 73''' that is associated with the second conveying means 27 is shown in FIG. 2B. The conveyor belt 73'''' of the portioning region 67 that is associated with the first conveying means 25 can, in contrast, be seen in FIGS. 2A and 4. In addition to the collection and transporting away of cut-off slices or pieces, the conveyor belts 73''', 73'''' of the portioning region 67 also serve to support the products 13 and 15, which are fed horizontally far through the cutting plane S, during a slicing so that a bending of the products 13 and 15 can be avoided, for example.

Due to a pulling forward of the conveyor belts 73''', 73'''' of the portioning region 67, formed portions comprising at least one slice of at least one piece can be transferred in the feed direction Z to a conveying device 71 arranged downstream that can feed the portions to further processing steps and, for example, to a packaging machine for packaging the portions (cf. also FIGS. 1A and 1B). Furthermore, the arrangement of a plurality of slices or pieces combined to form a portion can be influenced by a pulling forward of the conveyor belts 73''', 73'''' so that, for example, the slices of a portion can be arranged overlapping one another in the feed direction Z.

As the perspective rear view of FIG. 2A shows, the product feed 23 has a common support structure 28 for the conveying means 25 and 27. This support structure 28 comprises a center support 31 that substantially extends in the feed direction Z and that is arranged between and holds the conveying means 25 and 27. This center support 31 thus so-to-say forms a central structure of the product feed 23 and defines a vertical separation plane with respect to which the conveying means 25 and 27 and the blades 19 and 21 are arranged symmetrically or mirror-symmetrically (cf. in particular also FIG. 3A). Furthermore, the center support 31 is fixedly connected to a frame 29 of the cutting apparatus 11 supported on the ground so that neither the center support 31 nor the conveying means 25 and 27 held thereat are movable relative to the frame 29, apart from the revolving movement of the conveyor belts 43a, 43a', 43b, 43b' in the feed direction Z, and the conveying means 25 and 27 always remain in the provided orientation for guiding the products 13 and 15 into the cutting region 17.

Since the center support 31 arranged between the conveying means 25 and 27 holds the conveying means 25 and 27, they are arranged offset in parallel from one another with respect to the feed direction Z. This enables a narrow and symmetrical design of the cutting apparatus 11 with respect to a direction perpendicular to the feed direction Z so that a simultaneous slicing of the products 13 and 15 can be achieved by means of a single, compact mechanical design.

Furthermore, this symmetrical design of the product feed 23 having conveying means 25 and 27 held at oppositely disposed sides at the center support 31 enables access at both sides to the product feed 23 so that products 13 and 15 can, for example, be loaded onto the conveying means 25 and 27 from both sides (cf. FIGS. 3A and 3B). Such a loading, for example a manual loading, of the products 13 and 15 can in particular be provided if the cutting apparatus 11 is not provided as a part of the processing line 87, but the cutting operation is rather independent of further processing steps.

A switch cabinet 81 is arranged beneath the conveyor belts 43a, 43a', 43b, 43b' of the conveying means 25 and 27 and comprises the electronic components of the cutting apparatus 11 and in particular a control device 53. The switch cabinet 81 is thereby arranged in a region in which the product feed 23 anyway has to have a certain extent for the attachment of the conveying means 25 and 27 so that this extent is at least substantially not increased by the switch cabinet 81 and a compact and narrow design of the product feed 23 can be achieved. Furthermore, the switch cabinet 81 also serves to support the center support 31 and to fixedly connect it to the frame 29 (cf. FIG. 4).

The control device 53 arranged in the switch cabinet 81 can in particular be configured to control the drives 39 and 41 independently of one another so that the products 13 and 15 can also be independently guided into the cutting region 17 and, for example, at different speeds. Furthermore, the control device 53 can be configured to control the rotations of the blades 19 and 21 and in particular to vary their rotational speeds during one revolution, as is described below. For this purpose, the control device 53 can comprise a microprocessor and/or a CPU, for example.

As FIG. 4 shows, the center support 31 has four first mandrels 35 which extend perpendicular to the feed direction Z and onto which the first conveying means 25 or its base part 33 can be plugged. Four second mandrels 37 are likewise provided perpendicular to the feed direction Z and opposite to the first mandrels 35 for the plugging on of the second conveying means 27. This makes it possible to selectively connect the conveying means 25 and 27 to the center support 31 or to release them therefrom in a simple manner so that the conveying means 25 and 27 can, for example, be removed from the product feed 23 in a fast and uncomplicated manner for cleaning purposes. Furthermore, due to such a modular design of the product feed 23, a use of the same and exchangeable components can be achieved and the attachment or assembly of the conveying means 25 and 27 can also be facilitated. To reliably hold the conveying means 25 and 27 in a predefined position, in particular during a cutting operation, fixing elements can furthermore be provided that can be plugged onto or screwed onto the mandrels 35 and 37 to prevent the conveying means 25 and 27 from slipping off from the mandrels 35 and 37.

As can in particular be seen from FIG. 5A, the first blade 19 is held in a first blade mount 45 and the second blade 21 is held in a second blade mount 47. Furthermore, the blades 19 and 21 are oriented in mirror symmetry with one another with respect to the already mentioned vertical separation plane that is defined by the center support 31 and that extends in parallel with the feed direction Z and centrally between the conveying means 25 and 27.

Provision can be made that the blades 19 and 21 or the associated blade mounts 45 and 47 can be set into rotations in opposite senses by the control device 53. It can thereby, for example, be achieved that products 13 or 15 removed from different halves of an animal are processed simultaneously by means of the cutting apparatus 11 and that the cutting processes can take place ideally adapted to the respective products. For example, the products 13 and 15 of different halves of an animal can be sorted onto the conveying means 25 and 27 such that a bone is, for example, always guided into the cutting region 17 in a manner inwardly disposed or outwardly disposed on both the first conveying means 25 and the second conveying means 27 with respect to said separation plane. Due to the rotation in opposite senses of the blades 19 and 21 arranged in mirror symmetry with one another, an approximately uniform cut can in this respect be performed for both products 13 and 15, with in particular the bone being able to be cut through first or last. Such a sorting can in particular take place automatically by means of the distribution and sorting device 79 shown in FIGS. 1A and 1B.

The blades 19 and 21 are configured as one-armed scythe-like blades having narrow knife blades 49. This makes it possible to design the blades 19 and 21 with a relatively low weight so that the blades 19 and 21 can be accelerated and decelerated during a rotation for cutting off a slice and/or a piece. Such a deceleration of the blades 19 and 21, for example caused by the control device 53, during a rotation can increase the time available for a feeding into the cutting region 17 during which the blades 19 and 21 do not engage into the products 13 and 15. Accordingly, the products 13 and 15 can be fed sufficiently far into the cutting region 17 to be able to cut off relatively thick slices or large pieces. Due to an acceleration of the blades 19 and 21 that follows a deceleration, the cutting forces can be generated that are necessary for cutting off a slice or a piece and that are in particular high for processing fresh meat products. However, provision can in particular also be made in dependence on the respective product 13 to be processed and/or on the slice thickness or piece thickness to drive the blades 19 and 21 at a rotational speed that is constant during a blade rotation.

The respective blade edges 51 of the blades 19 and 21 first extend in the shape of an Archimedean spiral, starting from the respective blade mount 45 or 47, and extend in the shape of a logarithmic spiral toward the blade tips 93. This design of the blade edges 51 of the blades 19 and 21 can make it possible to always perform a pulling cut during a rotation of the blades 19 and 21 for cutting off a slice or a piece from the products 13 and 15 to be able to perform said cut precisely and without the occurrence of large force peaks. Furthermore, the blade edges 51 can be at least partly toothed in particular in order to enable a cutting through of bones which fresh meat products to be processed may have, for example.

Alternatively to this, the blades 19 and 21 can, for example, also be configured as scythe-like blades having wide knife blades or as circular blades. In addition, the blades 19 and 21 can be formed with smooth blade edges. An ideally adapted blade 19 or 21 can in particular be selectively inserted into the respective blade mount 45 or 47 and in dependence on a product 13 to be processed.

As in particular FIGS. 2B and 5B show, a blade guide 55 is arranged in the cutting region 17 and has a rear boundary 61 and respective front boundaries 59 for the blades 19 and 21, wherein only the front boundary 59 for the second blade 21 is shown. In this respect, the rear boundary 61 and the front boundary 59 form a respective peripheral gap 57 in which the blades 19 and 21 revolve and in which the cutting plane S extends. Due to the arrangement of the blades 19 and 21 in such a peripheral gap 57, the blades 19 and 21 can be reliably and stably guided with respect to the feed direction Z and a possible deflection, bending or tilting of the blades 19 and 21 due to force peaks or blows occurring during a cut can be counteracted. A boundary attachment 85 shown in FIG. 5A is provided to also closely guide the blade 21 in the direction of the rear boundary 61 during a cut and to compensate the offset of the blade 21 from the rear boundary 61 caused by the connection of the blade mount 47 to the rear boundary 61. A similar boundary attachment 85 can also be provided for the blade 19.

Furthermore, the rear boundary 61 has a respective rear passage 65 for the products 13 and 15 through which the products 13 and 15 enter the cutting region 17. The front boundary 59 has a front passage 63 in alignment therewith so that the rear boundary 61 and the front boundary 59 form a frame-like passage for the products 13 and 15 into the cutting region 17 in addition to the peripheral gap 57 for the blades 19 and 21. A defined guidance of the products 13 and 15 into the cutting region 17 as well as a positioning and a support during the cutting off of a slice or of a piece can thereby be achieved, wherein in particular the rear passage 65 can act as a blade edge and can so-to-say form the end of the product feed 23.

As, for example, FIGS. 5A and 5B show, the blades 19 and 21 cover the maximum clearance of the passages 63 and 65 so that the blades 19 and 21 are at all times during a cut supported and guided at both sides by the rear boundary 61 and the front boundary 59 both at the ends held by the blade mounts 45 and 47 and at the blade tips 93. The blade tips 93 are thus never free in the passages 63 or 65 so that forces acting on the blades 19 and 21 in the feed direction Z can always be led off at both sides to the boundaries 59 and 61.

Whereas the blades 19 and 21 in FIG. 5A are arranged offset from one another in the radial direction with respect to their axes of rotation such that the paths described by the blades 19 and 21 during a rotation do not overlap, provision can also be made that the blades 19 and 21 revolve in cutting planes S offset in parallel from one another and can at least partly overlap, in particular with their blade tips 93, during a rotation. Accordingly, in some embodiments, the blades 19 and 21 can be arranged with a smaller spacing from one another in the radial direction to be able to achieve a design of the cutting apparatus 11 that is as narrow as possible.

REFERENCE NUMERAL LIST 11 cutting apparatus
13 first product
15 second product
17 cutting region
19 first blade
21 second blade
23 product feed
25 first conveying means
27 second conveying means
28 support structure
29 frame
31 center support
33 base part
35 first mandrel
37 second mandrel
39 first drive
41 second drive
43a conveyor belt
43a' conveyor belt
43b conveyor belt
43b' conveyor belt
45 first blade mount
47 second blade mount
49 knife blade
51 blade edge
53 control device
55 blade guide
57 peripheral gap
59 front boundary
61 rear boundary
63 front passage
65 rear passage
67 portioning region
71 conveying device arranged downstream
73 conveyor belt
73' conveyor belt
73" conveyor belt
73'" conveyor belt
73"" conveyor belt
75 product holder
77 press
79 distribution and/or sorting device
81 switch cabinet
83 feed
85 boundary attachment
87 processing line
89 introduction section
91 introduction device
93 blade tip
95 guide of the product holder
S cutting plane
Z feed direction

The invention claimed is:

1. A cutting apparatus for cutting off or slicing meat products having a product feed that is configured to guide at least one first product and at least one second product simultaneously along a feed direction (Z) into a cutting region, includes a first rotating blade and a second rotating blade for cutting off or slicing the products into smaller pieces, wherein the product feed has a first conveying means for guiding the at least one first product into the cutting region and a second conveying means for guiding the at least one second product into the cutting region, wherein the first rotating blade is associated with the first conveying means and is provided for cutting off or slicing the at least one first product, wherein the second rotating blade is associated with the second conveying means and is provided for cutting off or slicing the at least one second product, the product feed comprising a common support structure for supporting the first conveying means and the second conveying means, the support structure having a center support that extends in the feed direction (Z) and that is arranged between and extends above the first conveying means and the second conveying means, the first conveying means and the second conveying means mounted on the center support, and the center support being fixedly connected to a frame supported on a ground surface, with the center support holding the first conveying means and the second conveying means in fixed relation to the frame.

2. A cutting apparatus in accordance with claim 1, wherein the first conveying means and the second conveying means extend next to one another offset in parallel along the feeding direction (Z).

3. A cutting apparatus in accordance with claim 1, wherein the first conveying means and the second conveying means comprise respective base parts that are selectively connectable to or releasable from the center support.

4. A cutting apparatus in accordance with claim 1, wherein the product feed comprises a first drive for the first conveying means and a second drive for the second conveying means, by means of which drives the first conveying means and the second conveying means are drivable independently of one another.

5. A cutting apparatus in accordance with claim 1, wherein the first conveying means and the second conveying means comprise at least one respective conveyor belt.

6. A cutting apparatus in accordance with claim 1, wherein the product feed for the first conveying means and/or for the second conveying means comprises at least one respective product holder that is configured to hold the first product and/or the second product in a rear product section during the guidance into the cutting region.

7. A cutting apparatus in accordance with claim 1, wherein the feed direction (Z) extends horizontally, and wherein the blades define a respective vertically oriented cutting plane (S).

8. A cutting apparatus in accordance claim 1, wherein the first blade is held in a first blade mount, and wherein the second blade is held in a second blade mount, the first blade mount and the second blade mount configured to rotate in opposite directions.

9. A cutting apparatus in accordance with claim 1, wherein the first blade and the second blade are formed as one-armed blades having narrow curved knife blades.

10. A cutting apparatus in accordance with claim 1, wherein the first blade and the second blade have a respective blade edge that is at least sectionally of spiral shape.

11. A cutting apparatus in accordance with claim 1, wherein the first blade and the second blade have a respective at least sectionally toothed blade edge.

12. A cutting apparatus in accordance with claim 1, wherein a control device is provided for controlling the rotational speeds of the rotating blades, the control device configured to accelerate and/or decelerate the rotating blades during a cutting revolution of the respective rotating blade, wherein the acceleration and/or deceleration adjusts the thickness of the slice and/or size of the piece cut by the blades in the cutting region, a cutting revolution being a single revolution between two successive cuts performed by the respective rotating blade.

13. A cutting apparatus in accordance with claim 1, wherein a blade guide is arranged in the cutting region and has a respective peripheral gap for the blades that is defined by a front boundary with respect to the feed direction (Z) and by a rear boundary with respect to the feed direction (Z).

14. A cutting apparatus in accordance with claim 13, wherein the front boundary and the rear boundary have mutually aligned passages for the first product and/or for the second product.

15. A cutting apparatus in accordance with claim 14, wherein the first blade and/or the second blade covers/cover the maximum clearance of the passages during a rotation.

16. A cutting apparatus in accordance with claim 1, wherein the cutting apparatus has a portioning region in which portions are formed, the portions comprising at least one smaller piece cut off or sliced from the products.

17. A method of slicing or cutting meat products into smaller pieces wherein at least two products are fed along a feed direction (Z) into a cutting region of a cutting apparatus in accordance with claim 1, and wherein smaller pieces are cut off or sliced from each of the at least two products by the respective rotating blade.

18. A method in accordance with claim 17, wherein the at least two products are guided into the cutting region by means of respective conveying means arranged offset in parallel with one another.

19. A method in accordance with claim 17, wherein the products are guided along a horizontal direction (Z) into the cutting region, with the blades rotating in a respective vertically oriented cutting plane (S).

20. A method in accordance with claim 17, wherein the blades are accelerated and/or decelerated during a single rotation of the blades while the blades are not engaged with the products being fed along the feed direction (Z), wherein the acceleration and/or deceleration adjusts the thickness of a slice and/or size of a piece cut by the blades in the cutting region.

21. A method in accordance with claim 17, wherein portions are formed, each portion comprising one or more of the smaller pieces cut off or sliced from the products.

22. A cutting apparatus for cutting off or slicing meat products having a product feed that is configured to guide at least one first product and at least one second product simultaneously along a feed direction (Z) into a cutting region, includes a first rotating blade and a second rotating blade for cutting off or slicing the products into smaller pieces, wherein the product feed has a first conveying means for guiding the at least one first product into the cutting region and a second conveying means for guiding the at least one second product into the cutting region, wherein the first rotating blade is associated with the first conveying means and is provided for cutting off or slicing the at least one first product, wherein the second rotating blade is associated with the second conveying means and is provided for cutting off or slicing the at least one second product, the product feed comprising a common support structure for supporting the first conveying means and the second conveying means, the common support structure having a center support that extends in the feed direction (Z) and that is arranged between and extends above the first conveying means and the second conveying means, the first conveying means and the second conveying means mounted on the center support, and the center support holding the first conveying means and the second conveying means, wherein the center support has at least one first mandrel which extends perpendicular to the feed direction (Z) and onto which the first conveying means can be selectively plugged and from which the first conveying means can be selectively released, and wherein the center support has at least one second mandrel which extends perpendicular to the feed direction (Z) and opposite to the first mandrel and onto which the second conveying means can be selectively plugged and from which the second conveying means can be selectively released.

* * * * *